United States Patent
Hsu et al.

(10) Patent No.: US 8,288,453 B2
(45) Date of Patent: Oct. 16, 2012

(54) PROCESS TO DISPERSE ORGANIC MICROPARTICLES/NANOPARTICLES INTO NON-AQUEOUS RESIN MEDIUM

(75) Inventors: Chih-Pin Hsu, Parkville, MO (US); Ming Yang Zhao, Kansas City, MO (US); Steven L. Voeks, Smithville, MO (US)

(73) Assignee: CCP Composites US, North Kansas City, MO (US)

( * ) Notice: Subject to any disclaimer, the term of this patent is extended or adjusted under 35 U.S.C. 154(b) by 525 days.

(21) Appl. No.: 12/473,983

(22) Filed: May 28, 2009

(65) Prior Publication Data

US 2009/0326137 A1     Dec. 31, 2009

Related U.S. Application Data

(60) Provisional application No. 61/076,082, filed on Jun. 26, 2008.

(51) Int. Cl.
| | |
|---|---|
| *C08L 67/06* | (2006.01) |
| *C08L 51/08* | (2006.01) |
| *C08F 283/01* | (2006.01) |
| *C08J 3/00* | (2006.01) |

(52) U.S. Cl. ........................................ 523/201; 524/458
(58) Field of Classification Search .................. 523/201; 524/458

See application file for complete search history.

(56) References Cited

U.S. PATENT DOCUMENTS

| | | | |
|---|---|---|---|
| 5,176,959 | A | 1/1993 | Yamada et al. |
| 5,565,504 | A | 10/1996 | Dannhorn et al. |
| 6,586,097 | B1 | 7/2003 | Pascault et al. |
| 6,878,776 | B1 | 4/2005 | Pascault et al. |
| 6,887,931 | B2 | 5/2005 | Twardowska et al. |
| 7,091,275 | B1 | 8/2006 | Amick et al. |
| 2005/0228124 | A1 | 10/2005 | Swarup et al. |

FOREIGN PATENT DOCUMENTS

| | | |
|---|---|---|
| CN | 1454931 | 11/2003 |
| DE | 2746481 A1 | 4/1979 |
| EP | 1484355 A1 | 12/2004 |
| WO | 2008/006580 A2 | 1/2008 |
| WO | WO 2008/006580 * | 1/2008 |

* cited by examiner

*Primary Examiner* — Kelechi Egwim
(74) *Attorney, Agent, or Firm* — Whyte Hirschboeck Dudek SC

(57) ABSTRACT

A process to disperse organic microparticles/nanoparticles into non-aqueous resin medium is provided. The process includes the steps of a) preparing a resin dispersion/emulsion in water and/or solvent where the resin contains unsaturation in the polymer chain and optionally comprises an ethylenically unsaturated monomer; b) curing the resin dispersion/emulsion by adding monomer and/or initiator; and c) adding the cured dispersion/emulsion during a synthesis step of a resin medium. The amount of organic microparticles/nanoparticles in the resin medium can be about 2 to about 30% by weight based on the total weight of the composition.

20 Claims, No Drawings

PROCESS TO DISPERSE ORGANIC MICROPARTICLES/NANOPARTICLES INTO NON-AQUEOUS RESIN MEDIUM

CROSS-REFERENCE TO RELATED APPLICATIONS

This application claims the benefit of U.S. Provisional Application Ser. No. 61/076,082, filed Jun. 26, 2008.

BACKGROUND OF THE INVENTION

The preparation of organic microparticles/nanoparticles is well known in the coating industry for providing unique properties for coating applications. Such organic microparticles/nanoparticles can be prepared by either emulsion polymerization in an aqueous medium or by dispersion polymerization in a non-aqueous medium. Techniques of preparing the organic microparticles/nanoparticles are well documented. The essential techniques are incorporated into the preparation process to provide stability of the microparticles/nanoparticles during the polymerization process and functionality on the microparticles/nanoparticles for use in later applications.

German Patent DE2746481 describes a procedure to produce reactive micro-gels from unsaturated polyesters and reactive monomer. As described, an unsaturated polyester was emulsified in water with/without an optional surfactant under constant mixing. The resulting reactive micro-gels had a diameter from 10 to 300 nanometers and reactive hydroxyl or carboxyl groups on the surface. The weight ratio of the unsaturated polyester to monomer was from 1:10 to 10:1 to produce the reactive micro-gels.

U.S. Pat. No. 5,176,959 describes crosslinked polymer microparticles produced by emulsion polymerizing a monomer mixture containing a crosslinking monomer having a plurality of polymerizable sites in the molecule, in an aqueous medium containing a polymeric amide-acid and a neutralizing base as an emulsifier/dispersant. The polymer microparticles were then incorporated in thermosetting coating compositions for rheology control and other purposes.

U.S. Pat. No. 5,565,504 describes an aqueous dispersion of a reactive micro-gel comprising a polymer of at least one allyl ether-containing polyester or polyester urethane. The microgels had an average diameter of 10 to 1000 nanometers, and were insoluble but swelled in the usual organic solvents, i.e., alcohols (e.g. methanol, isopropanol), ketones (e.g., acetone, methyl ethyl ketone), esters (e.g., butyl acetate) and aromatic and non-aromatic hydrocarbons (e.g., toluene). The aqueous dispersion of the reactive micro-gel was dried without an additional film-forming agent to form a uniform, transparent and reactive film.

A coating composition containing crosslinked microparticles is also described in US Published Application 2005/0228124. The crosslinked microparticles were formed from (i) a $C_8$ to $C_{20}$ alkyl ester of (meth)acrylic acid; (ii) a polymerizable ethylenically unsaturated monomer having a polar functional group; and (iii) optionally, a polymerizable ethylenically unsaturated monomer, wherein (i), (ii) and (iii) are different from each other; and the polymer had a glass transition temperature of no more than $-10°$ C.

U.S. Pat. No. 7,091,275 describes an aqueous polymeric composition containing select polymeric nanoparticles. The polymeric nanoparticles contain, as polymerized units, at least one multiethylenically unsaturated monomer and at least one water soluble monomer. The polymeric nanoparticles had a mean diameter in the range of from 1 to 50 nanometers. The aqueous polymeric composition was described as useful for preparing coatings having at least one improved property compared to a coating absent the select polymeric nanoparticles.

U.S. Pat. No. 6,586,097 describes crosslinked microparticles between 10-300 nanometers in size. The crosslinked microparticles were obtained by dispersion polymerization in a non-aqueous medium which is a non-solvent for the formed polymer. The reaction composition comprised at least one monomer A comprising only one ethylenic unsaturation, giving the microparticles self-stabilization during and after polymerization without any addition of stabilizing agent; at least one compound B comprising at least two ethylenic unsaturations; and optionally, at least one compound C comprising only one ethylenic unsaturation and/or at least one compound D which is different from A, B and C and comprising at least one ethylenic unsaturation which can undergo radical-mediated polymerization and at least one second reactive function $f1$ which is other than an ethylenic unsaturation.

U.S. Pat. No. 6,878,776 describes thermosetting compositions comprising crosslinked polymer microparticles with a size ranging from 10 to 300 nm and carrying at least one reactive functional group which can react with at least one of the reactive components of the thermosetting composition. The microparticles may also carry at least one second reactive functional group which can react with another functional group of the same type carried by another microparticle and/or by a reactive component of the thermosetting composition. The microparticles are at least partially soluble, miscible and/or dispersible in the starting thermosetting composition.

WO 2008/006580 describes a process for preparing organic nanoparticles by the steps of (a) preparing a solution comprising an unsaturated polyester and/or a vinyl ester resin, an initiator and a hydrophobic monomer; (b) emulsifying the solution obtained in step (a) in an aqueous phase; and, thereafter, (c) curing the emulsified solution. European Patent No. 1,484,355 describes a process for preparing polymeric nanoparticles with a mean particle diameter of 1 to 200 nanometers. The process is emulsion free and yields a solid level of polymeric nanoparticles equal to or greater than 30 weight %.

Nanoscale materials, such as carbon black, famed silica, titanium dioxide, and organo-clay, have been produced and used for decades. In order to fully disperse these nanoscale materials in a resin medium, high shear mechanical mixing or chemical exfoliation is typically applied during the dispersion process. U.S. Pat. No. 6,887,931 describes thermosetting inorganic clay nano-dispersions comprising an inorganic clay treated in situ with an intercalation agent and an intercalation facilitating agent. CN 1454931 describes a method to incorporate silicon dioxide into an unsaturated polyester resin. The silicon dioxide was added into the reactor at the beginning or during the polycondensation reaction of making the unsaturated polyester resin. The silicon dioxide can be in powder form, in colloid aqueous solution, in organic solution or in a gel form.

BRIEF SUMMARY OF THE INVENTION

The invention is directed to a process to disperse organic microparticles/nanoparticles into a non-aqueous resin medium. In embodiments of the invention, the process includes the steps of a) preparing a resin dispersion/emulsion in water and/or organic solvent, wherein the resin contains unsaturation in the polymer chain and optionally comprises at least one ethylenically unsaturated monomer; b) curing the resin dispersion/emulsion by adding monomer and/or initiator to form a suspension of organic microparticles/nanoparticles; and c) adding the cured resin dispersion/emulsion (i.e., the suspension) during a synthesis step(s) of a resin medium.

The resin system used to make the resin dispersion/emulsion can be an unsaturated polyester, vinyl ester, polyurethane, unsaturated polyester/urethane hybrid, cross-linkable acrylic, or a mixture of any of these resins. The dispersion/emulsion medium is typically water, which may contain a small amount of a water-miscible organic solvent. In some embodiments in which the organic solvent is used as a constituent or raw material in the synthesis of the resin medium, a water medium can be completely replaced by an organic solvent as the medium of the resin dispersion/emulsion. The resin dispersion/emulsion can further include one or more surfactants.

The resin dispersion/emulsion can be cured by adding monomer and/or initiator to form the cured organic microparticles/nanoparticles. The cured organic microparticles/nanoparticles are freely suspended in the liquid medium, i.e., water and/or organic solvent. The cured organic microparticle/nanoparticle suspension in liquid medium can then be added into a resin medium at one or more stages during the resin synthesis process. Removal of the liquid medium (i.e., water and/or organic solvent) of the organic microparticles/nanoparticles suspension from the resin medium can occur at the same time as the removal of the reaction water from the resin medium. In embodiments in which the organic solvent is used in the synthesis of the resin medium, the organic solvent will not be removed but will react with other ingredients of the mixture to make the resin medium. The amount of organic microparticles/nanoparticles in the resin medium can be about 2 to 30% by weight, based on the total weight of the resin medium.

DETAILED DESCRIPTION OF THE PREFERRED EMBODIMENT

Organic microparticles/nanoparticles are typically made by a liquid phase method. Commonly used liquid phase methods for making the organic microparticles/nanoparticles include an emulsion polymerization in an aqueous medium or a dispersion polymerization in a non-aqueous medium, and techniques of preparing organic microparticles/nanoparticles by such methods are well documented. Such organic microparticles/nanoparticles are non-crosslinked or slightly crosslinked, and will swell in an organic solvent. The organic microparticles/nanoparticles are used primary in coating applications, and can be added directly into a coating formulation when the solvents of both systems are compatible.

The organic microparticles/nanoparticles can be made into powder form by various drying techniques. However, the organic microparticles/nanoparticles tend to agglomerate during the drying process, and the particle size of dry powder is usually larger than the original particle size in solution. In order to obtain the organic microparticles/nanoparticles with a particle size of less than 1000 nanometers, the microparticles/nanoparticles suspension must be very dilute prior to drying. As a result, the energy costs will be very high. Also, it is almost impossible to obtain the microparticles/nanoparticles in powder form with the same particle size in suspension.

The dispersion of dry inorganic microparticles/nanoparticles into a resin medium presents another challenge. In order to fully disperse dry microparticles/nanoparticles into a resin medium, high shear mechanical mixing or chemical exfoliation is typically applied during the dispersion process.

It is an object of the invention to provide a low cost alternative way to disperse organic microparticles/nanoparticles into a non-aqueous resin medium, especially into a resin medium containing an incompatible solvent to the organic microparticle/nanoparticle dispersion/suspension. The organic microparticles/nanoparticles can be prepared by emulsion polymerization, solution polymerization or dispersion polymerization. The organic microparticles/nanoparticles have an average particle diameter of about 10 to about 1000 nanometers, preferably about 20 to about 500 nm. The organic microparticles/nanoparticles can be incorporated into a non-aqueous resin medium during the synthesis of the resin medium, and can be added at various stages in the synthesis of resin medium. Various resin systems can be used to make the organic microparticles/nanoparticles. Therefore, the properties of the organic microparticles/nanoparticles can be designed to have the desired performance characteristics for final applications of a particular resin medium.

The invention is directed to a process to disperse organic microparticles/nanoparticles into a non-aqueous resin medium. In embodiments of the invention, the process includes the steps of (a) Preparing a resin dispersion/emulsion in water, an organic solvent, or a combination of both, wherein the resin contains unsaturation in the polymer chain and optionally comprises an ethylenically unsaturated monomer;

(b) Curing the resin dispersion/emulsion by adding monomer and/or an initiator to form a suspension of cured organic microparticles/nanoparticles;

(c) Adding the cured resin dispersion/emulsion during one or more synthesis steps of a non-aqueous resin medium.

The resin system used to make the resin dispersion/emulsion can be an unsaturated polyester, vinyl ester, polyurethane, unsaturated polyester/urethane hybrid, cross-linkable acrylic or the mixture of any of these resins. The resin dispersion/emulsion is typically water-based but can contain a minor amount of a water-miscible organic solvent. In some embodiments, the water medium of the resin dispersion/emulsion can be completely replaced by an organic solvent where the organic solvent may also be a component (i.e., raw material) in the synthesis of the non-aqueous resin medium. The resin dispersion/emulsion can optionally include ethylenically unsaturated monomers, surfactants and other additives such as inhibitors and stabilizers, traditionally used in these resin systems.

Suitable unsaturated polyester resins have at least one dicarboxylic alkene moiety and are preferably an oligomer of an $\alpha,\beta$-ethylenically unsaturated dicarboxylic acid compound obtained by the condensation reaction of one or more of a saturated di- or polycarboxylic acid or anhydride and an unsaturated di- or polycarboxylic acid or anhydride with a glycol or a polyhydric alcohol. The unsaturated polyester resin can also be prepared from unsaturated di- or polycarboxylic acid(s) or anhydride(s) with glycols and/or polyhydric alcohol(s). Examples of suitable saturated di- or polycarboxylic acids include isophthalic, orthophthalic, terephthalic, adipic, succinic, sebacic acid, trimellitic anhydride, and mixtures of two or more of these compounds with isophthalic acid being preferred. Typical unsaturated carboxylic acids or anhydrides include maleic acid, fumaric acid, citraconic acid, chloromaleic acid, allyl succinic acid, itaconic acid, mesaconic acid, their anhydrides, and mixtures of two or more such compounds, with maleic anhydride being referred. Examples of polyhydric alcohols which are useful in the invention include neopentyl glycol, ethylene glycol, diethylene glycol, triethylene glycol, propylene glycol, dipropylene glycol, 1,4-butanediol, polyethylene glycols, glycerol, mannitol, 1,2-propanediol, pentaerythritol, 1,6-hexanediol, 1,3-butylene glycol, and mixtures of two or more of such compounds. The production of such resins is well-known to those skilled in the art and, additionally, many suitable resins are commercially available from resin manufacturers, such as Cook Composites & Polymers Company, Kansas City Mo.

Vinyl ester resins can be generally prepared by reaction of an epoxy resin with an unsaturated monobasic acid. Any of the known polyepoxides can be used in the preparation of the vinyl ester resins. The unsaturated monobasic acids suitable for reaction with the polyepoxides include acrylic acid, methacrylic acid, crotonic acid, cinnamic acid, and the like. The vinyl ester resins can be further modified, for example, by maleic anhydride, to introduce carboxy groups, and to increase the ability to a make dispersion/emulsion in water. The production of vinyl ester resins is well known to those skilled in the art and many suitable resins are commercially available from resin manufactures, such as Cook Composites & Polymers Company, Kansas City, Mo.

Polyurethane resin systems useful for making the cured microparticles/nanoparticles are those containing unsaturation in the polymer chain. Examples of polyurethane resin systems include urethane acrylates, which is the reaction products of polyols, diisocyanates, and hydroxyalkyl (meth) acrylates. The unsaturated polyester/urethane hybrid resin systems are similar to the polyurethane resin systems, except that the unsaturated polyester/urethane hybrid resin systems contain unsaturated polyester polyols in the polymer chain.

Suitable cross-linkable acrylics can be prepared by polymerizing an acrylic monomer/oligomer mixture containing crosslinking molecule having a plurality of polymerizable sites in the molecule. The techniques of making cross-linkable acrylics are well known in the coating industry.

The resin dispersion/emulsion should exhibit stability for a desired period of time such that the resin dispersion/emulsion can be made and stored without having to be processed through steps (b) and (c) of the invention immediately. When liquid resin systems are used to make cured microparticles/nanoparticles, step (a) of preparing the resin dispersion/emulsion in water, solvent or combination of both, can be performed immediately before conducting step (b) since liquid resin systems can be easily dispersed or emulsified at the desired time to make the cured microparticles/nanoparticles.

Optional ethylenically unsaturated monomers useful for making the cured microparticles/nanoparticles include, for example, aromatic (vinyl) compounds, acrylates or methacrylates. The ethylenically unsaturated monomer can be any ethylenically unsaturated monomer capable of crosslinking an unsaturated polyester resin via vinyl addition polymerization. Examples of useful ethylenically unsaturated monomers include styrene, o-, m-, p-methyl styrene, methyl acrylate, methyl methacrylate, (meth)acrylic acid, hydroxyl acrylate, t-butylstyrene, divinyl benzene, diallyl phthalate, triallyl cyanurate, and mixtures of two or more unsaturated monomers. The preferred monomer is styrene, which provides an economical monomer solution.

In step (b), a monomer or mixture of monomers can be added and mixed into the resin dispersion/emulsion to make the cured organic microparticles/nanoparticles. The cured microparticles/nanoparticles can be made through typical curing processes for thermosetting resins. Such a process can comprise adding initiator(s) and promoter(s) to a resin or resin solution and (i) curing at ambient temperature, or (ii) heating the material to an elevated temperature to cure the resin. A typical curing condition can be conducted at an ambient temperature up to 95° C. when the medium is water, or an ambient temperature up to at least 5° C. below the boiling temperature of the resin dispersion/emulsion for a non-aqueous medium. The cured organic microparticles/nanoparticles can be post-cured at an elevated temperature to further increase the degree of cure (conversion). The cured organic microparticles/nanoparticles should have a degree of cure above 70%, preferably above 80%. The cured nanoparticle dispersion should contain less than 0.5 weight % and preferably less than 0.3 weight % free monomer as measured by gas chromatography (GC) technique.

Initiators useful in producing the cured resin dispersion/emulsion compositions include vinyl polymerization catalysts such as organic peroxides, persulfides, persulfates, perborates, percarbonates, and azo compounds, or any other suitable catalyst capable of catalyzing the vinyl polymerization of the polyester polyol and/or the ethylenically unsaturated monomer. The initiators can be either water-soluble or oil-soluble compounds. Illustrative of such catalysts are benzoyl peroxide (BPO), tertiarybutyl peroxybenzoate (TBPB), 2,2'-azo-bis-isobutyronitrile (AIBN), dibenzoyl peroxide, lauryl peroxide, di-t-butyl peroxide, diisopropyl peroxide carbonate, t-butyl peroxy-2-ethylhexanoate, potassium persulfate, and ammonium persulfate. Promoters can also be used in combination with vinyl polymerization peroxide catalysts to control the rate of free radical initiation. A common benzoyl peroxide promoter is N,N-diethylaniline.

A constant mixing should be applied to the resin (and optional monomer) dispersion/emulsion during the curing process. The mixing is necessary to control the temperature below the boiling point of the resin dispersion/emulsion since the cross-linking reaction is exothermic. Mixing is also important to maintain the cured microparticles/nanoparticles separate from each other during the reaction. Insufficient mixing typically results in agglomeration or gelation of the microparticle/nanoparticle dispersion. The cured organic microparticles/nanoparticles have an average diameter from about 10 nanometers to about 1000 nanometers, preferably from about 20 nm to about 500 nm, and the viscosity of the suspension of the cured organic microparticles/nanoparticles in water, solvent, or a combination of both, is preferably less than about 5000 mPa·s (cps). The organic microparticles/nanoparticles of the cured resin dispersion/emulsion should be freely suspended in the liquid medium (i.e., water and/or solvent), and stable without separation during storage (e.g. for up to about 90 days).

The cured resin dispersion/emulsion composed of the cured organic microparticles/nanoparticles in suspension in liquid medium can be combined with a non-aqueous resin medium, which is a thermosetting resin system, during the synthesis process of the non-aqueous resin medium. Thermosetting resin systems include unsaturated polyester resins, cross-linkable acrylic resins, urethane acrylic resins, and unsaturated polyester/polyurethane hybrid resins. The non-aqueous resin medium can also be a polyol for producing a polyurethane resin. The non-aqueous resin medium is typically made by batch process, and may require multiple steps for the synthesis process.

In the synthesis of an unsaturated polyester resin medium, a cured organic microparticle/nanoparticle water suspension can be added into the reactor with other suitable ingredients at the beginning of the reaction. The temperature of the reactor can be gradually raised to the boiling point of the resin mixture. Water/co-solvent from the cured resin dispersion/emulsion is generally removed from the resin medium mixture at the same time that reaction water is removed from the resin medium. If the organic microparticles/nanoparticles are suspended in organic solvent where the organic solvent is also a raw material (component) in the synthesis of the unsaturated polyester resin medium, the temperature can be raised directly to the esterification temperature. The synthesis can then proceed under typical conditions for making the unsaturated polyester resin medium.

If the unsaturated polyester resin medium is made by multiple stages, the cured organic microparticle/nanoparticle suspension can be added into the reactor at a later stage of the reaction. However, the reactor temperature should be lower than the boiling temperature of the organic microparticle/nanoparticle suspension. The water/co-solvent of the microparticle/nanoparticle suspension can be removed by distillation or through vacuum stripping. If the cured organic microparticles/nanoparticles are suspended in organic solvent where the organic solvent is also a raw material (component) in the synthesis of the unsaturated polyester resin medium, the temperature can be raised directly to the esterification temperature and synthesis of the resin medium can proceed under typical conditions. Similar steps can be followed in the synthesis of polyols for a polyurethane resin medium.

In the synthesis of a cross-linkable acrylic or urethane acrylic resin medium, the cured organic microparticle/nanoparticle suspension can be added into the resin medium and all of the water/co-solvent of the microparticle/nanoparticle suspension can be removed before the epoxy or the diisocyanate components are added. If the cured organic microparticles/nanoparticles are suspended in an organic solvent where the organic solvent is also a raw material (component) in the synthesis of the resin medium, the reaction can proceed according to the normal synthesis steps for synthesis of the cross-linkable acrylic or urethane acrylic resin medium.

The resin medium can be mixed or blended with one or more compatible unsaturated monomers. Examples of suitable unsaturated monomers include aromatic vinyl compounds such as styrene, alpha-methylstyrene, dichlorostyrene, vinyl naphthalene, vinyl phenol, vinyl toluene, divinyl benzene and the like; unsaturated esters, such as acrylic and methacrylic esters, vinyl laurate, and the like; unsaturated acids, such as acrylic and alpha-alkylacrylic acids, butenoic acid, allylbenzoic acid, vinylbenzoic acid, and the like; halides, such as vinyl chloride, and vinylidene chloride; nitriles, such as acrylonitrile, and methacrylonitrile; diolefins, such as butadiene, isoprene, and methylpentadiene; esters of polycarboxylic acids, such as diallyl phthalate, divinyl succinate, diallyl mateate, divinyl adipate, dichloroallyl tetrahydrophthalate, and the like; and mixtures thereof.

The resin medium (thermosetting resin system) can further contain additives, such inhibitors and stabilizers, generally known and used in the composites industry.

The amount of the cured organic microparticles/nanoparticles in the non-aqueous resin medium can be about 2 to about 30% by weight, based on the total weight of the resin medium. The lower limit of the cured organic microparticles/nanoparticles in the resin medium is based on the impact on the properties of the cured resin, such as the mechanical properties. The upper limit of the cured organic microparticles/nanoparticles in the resin medium is generally dependent on the desired viscosity of the resin medium, which should be less than about 5000 mPa·s (cps) when the maximum allowable amount of unsaturated monomer is added. The % unsaturated monomer in the final resin is in the range of about 20 to about 50 weight % based on the total weight of the resin medium, including the unsaturated monomer and the cured organic microparticles/nanoparticles.

The cured microparticles/nanoparticles can contain/bear reactive groups that react with the thermosetting resin medium during the synthesis of the resin medium in the presence of the cured microparticles/nanoparticles. Such reactive groups include, without limitation, hydroxy, carboxy, amine, and epoxy groups.

The thermosetting resin medium containing the cured microparticles/nanoparticles can be used in various applications. The cured microparticles/nanoparticles can replace or partially replace typical fillers that are used in composite materials. The use of the cured microparticles/nanoparticles in thermosetting polymer materials can increase the mechanical strength, lower the porosity and increase the clarity of the cured resin.

Unless otherwise specified herein, the term "viscosity" refers to the viscosity of a polymer in styrene monomer at 70 wt. % NVM (non-volatile material, see below) at 25° C. measured using a Brookfield Viscometer.

The term "NVM" refers to non-volatile material dispersed in a volatile substance (e.g., styrene monomer) as measured according to ASTM D1259.

The following examples illustrate steps in the preparation of a non-aqueous thermosetting resin containing cured organic microparticles/nanoparticles according to the invention.

EXAMPLE 1

Synthesis of Organic Microparticles/Nanoparticles

In a glass container, 100 grams of a commercial unsaturated polyester dispersion (STYPOL 0405022) was mixed with 200 grams of deionized water, 14.6 grams of styrene monomer, and 6.7 grams of ABEX EP-120 (Rhodia). The mixture was mixed with a magnetic stirrer for 10 minutes, and heated to 70° C. on a hot plate while continuing the mixing with the magnetic stirrer. 0.11 grams of ammonium persulfate was dissolved in 3.0 grams of deionized water, and the ammonium persulfate solution was added into the resin dispersion mixture in 4 shots at 10 minute intervals. The resin dispersion was maintained at 70° C. for another 60 minutes while continuously mixing with the magnetic stirrer. The resulting resin dispersion was a yellow transparent liquid. The residual styrene content of the resin dispersion was 0.05%. The resin dispersion formed a transparent film when the water was removed from the dispersion. The remaining solid showed a residual exotherm of 12.8 J/g and a glass transition temperature of 62° C. by DSC.

EXAMPLE 2

Synthesis of Organic Microparticles/Nanoparticles

In a glass container, 50 grams of an unsaturated polyester dispersion (a NPG/DPG/IPA/MA/TMA type, 32% NVM) was mixed with 100 grams of deionized water, and 10.6 grams of styrene monomer. The mixture was mixed with a magnetic stirrer for 10 minutes. The mixture was heated to 80° C. on a hot plate while continuously mixing with the magnetic stirrer. 0.07 grams of ammonium persulfate was dissolved in 3.5 grams of deionized water. The ammonium persulfate solution was added into the resin dispersion mixture in 4 shots at 10 minutes intervals. The resin dispersion was held at 80° C. for another 60 minutes while continuously mixing with the magnetic stirrer. The resulting resin dispersion was a yellow transparent liquid. The mean particle size of the nanoparticles in the resin dispersion was 80 nm. The residual styrene content of the resin dispersion was 0.1%. The resin dispersion formed a transparent film when the water was removed from the resin dispersion. The remaining solid showed a residual exotherm of 20.3 J/g and a glass transition temperature of 151° C. by DSC.

COMPARATIVE EXAMPLE 3

Synthesis of Resin without Organic Nanoparticles

In a two-liter flask equipped with a stirrer, thermometer, a water separating column fitted with a reflux condenser and a nitrogen inlet, the following ingredients are combined (components (grams)): neopentyl glycol (463 g), 2-butyl-2-ethyl-1,3-propanediol (351 g), isophthalic acid (270 g), benzoic acid (38 g), an maleic anhydride (423 g). The charged mixture is processed in two-stages and a total of 190 parts of water is distilled off. The reaction mixture is held at 220° C. until an acid number of 10-20 is obtained. The reaction mixture is then cooled to less than 140° C. and the following ingredients are added (components (grams)): toluhydroquinone (0.2 g), and styrene (590 g).

EXAMPLE 4

Synthesis of Resin Containing Organic Microparticles/Nanoparticles

In a two-liter flask equipped with a stirrer, thermometer, a water separating column fitted with a reflux condenser and a nitrogen inlet, the following ingredients are added: (components (grams)): neopentyl glycol (463 g), 2-butyl-2-ethyl-1, 3-propanediol (351 g), isophthalic acid (270 g), nanoparticle dispersion from Example 2 (556 g), benzoic acid (38 g), and maleic anhydride (423 g). The charged mixture is following a two-stage synthesis process and a total of 596 parts of water are distilled off. The reaction mixture is held at 220° C. until an acid number of 10-20 is obtained. The reaction mixture is then cooled to less than 140° C. and the following ingredients are added: (components (grams)): toluhydroquinone (0.2 g), and styrene (542 g).

COMPARATIVE EXAMPLE 5

Synthesis of Polyester Acrylic Resin

Into a two-liter flask equipped with stirrer, thermometer, nitrogen introducing tube and condenser, the following ingredients were added: 427 grams of polycaprolactone triol (Tone™ polyol 0301, Dow Chemical) and 680 grams of hexahydrophthalic anhydride. The temperature was raised to 115° C. and kept at that temperature for 3 hours to make a polyacid. Then, 650 grams of glycidyl methacrylate, 0.2 grams of 2,3,5-trimethylhydroquinone and 0.8 grams of benzyltriethylammonium chloride were added. The reactor's atmosphere was changed from nitrogen to nitrogen with 5% oxygen, and the temperature raised to 115° C. and held at that temperature until the acid number was below 20. Then, 732 grams of styrene monomer and 0.2 grams of toluhydroquinone were added. The resulting polyester acrylic resin had a viscosity of 350 mPa·s (cP) at 70% wt solid content in styrene.

EXAMPLE 6

Synthesis of Polyester Acrylic Resin Containing Organic Microparticles/Nanoparticles Into a two-liter flask equipped with stirrer, thermometer, nitrogen introducing tube and condenser were placed 900 grams of polyacid from Comparative Example 5, 406 grams of toluene, 406 grams of isopropyl alcohol, and 110 grams of a commercial unsaturated polyester resin (STYPOL 0400902). The mixture was mixed well and the temperature was raised to 70° C., then 1.45 grams of 2,2'-azobis(2-methylbutyronitrile) (VAZO 67, DuPont) was added and held at 70° C. for 5 hours. The reactor temperature was raised slowly to 145° C. to remove the solvent. A 25-inch vacuum was applied for 30 minutes at the end. The reactor temperature was then decreased to 115° C., and 530 grams of glycidyl methacrylate, 0.16 grams of toluhydroquinone and 0.8 grams of acryloxyethyl trimethyl ammonium chloride were added. The reactor's atmosphere was changed from nitrogen to nitrogen with 5% oxygen and the temperature raised to 115° C. and held at that temperature until the acid number was below 20. Then, 635 grams of styrene monomer and 0.2 grams of 2,3,5-trimethylhydroquinone were added. The resulting polyester acrylic resin had a viscosity of 1620 mPa·s (cP) at 70% wt solid content in styrene.

Characters of Resin System Containing Microparticles/Nanoparticles

The resin samples were made into castings and the tensile properties, flexural properties, and HDT of the castings were measured following the ASTM Standard D-638, D-790, and D-648. Both tensile and flexural properties were measured at the ambient temperature.

TABLE 1

Viscosity and Physical Properties of Resin Samples

| | Resin Example | | | |
|---|---|---|---|---|
| | 3 | 4 | 5 | 6 |
| NVM (%) | 70 | 70 | 70 | 70 |
| Viscosity (cps) | 1500 | 1800 | 350 | 1620 |
| Tensile Strength (psi) | 9640 | 9620 | 11500 | 10380 |
| Tensile Modulus (kpsi) | 405 | 483 | 467 | 501 |
| Elongation | 3.37 | 2.65 | 5.48 | 5.27 |
| Flexural Strength (psi) | 15630 | 18127 | 19200 | 18500 |
| HDT (° C.) | 86 | 83 | 74 | 65 |

It is specifically intended that the present invention not be limited to the embodiments and illustrations contained herein, but include modified forms of those embodiments including portions of the embodiments and combinations of elements of different embodiments as come within the scope of the following claims. The disclosures of patents, references and publications cited in the application are incorporated by reference herein.

We claim:

1. A process to disperse organic microparticles/nanoparticles into a non-aqueous resin medium, comprising the steps of:
   (a) preparing a dispersion or emulsion of a first unsaturated resin in a liquid medium of water, organic solvent or a combination of both, wherein the first resin comprises a polymer chain containing unsaturation and, optionally, an ethylenically unsaturated monomer;
   (b) curing the first resin in the dispersion or emulsion by adding at least one of a monomer and an initiator to form a suspension of cured organic microparticles/nanoparticles in said liquid medium; and
   (c) adding the suspension of cured organic microparticles/nanoparticles to a reaction mixture during synthesis of a non-aqueous second resin medium.

2. The process of claim 1, wherein the first resin is selected from the group consisting of an unsaturated polyester, a vinyl ester, a polyurethane containing unsaturation, an unsaturated polyester/urethane hybrid, a cross-linkable acrylic, and mixtures thereof.

3. The process of claim 1, wherein the first resin comprises an ethylenically unsaturated monomer selected from the group consisting of aromatic (vinyl) compounds, acrylates and methacrylates.

4. The process of claim 1, wherein the curing step (b) comprises adding a vinyl polymerization initiator selected from the group consisting of organic peroxides, persulfides, persulfates, perborates, percarbonates, and azo compounds.

5. The process of claim 1, wherein the curing step (b) is conducted at an ambient temperature up to about 95° C.

6. The process of claim 1, wherein the curing step (b) is conducted at up to a curing temperature of at least 5° C. below the boiling temperature of the resin dispersion or emulsion.

7. The process of claim 1, wherein the cured organic microparticles/nanoparticles comprise less than about 0.5 weight % of free monomer.

8. The process of claim 1, wherein the cured organic microparticles/nanoparticles comprise less than about 0.3 weight % of free monomer.

9. The process of claim 1, wherein the cured organic microparticles/nanoparticles have an average particle size of about 10 nm to about 1000 nm.

10. The process of claim 1, wherein the cured organic microparticles/nanoparticles have an average particle size of about 20 nm to about 500 nm.

11. The process of claims 1, wherein the cured organic microparticles/nanoparticles have a degree of cure above about 70%.

12. The process of claim 11, wherein the cured organic microparticles/nanoparticles have a degree of cure above about 80%.

13. The process of claim 1, wherein the suspension of the cured organic microparticles/nanoparticles is added into the reaction mixture for the second resin medium at one or more stages during a resin synthesis process.

14. The process of claim 1, wherein the liquid medium of the suspension and reaction water are removed from the reaction mixture for the second resin medium about concurrently during the synthesis of the second resin medium.

15. The process of claim 1, wherein the liquid medium of said suspension and reaction water are removed from the reaction mixture for the second resin medium upon raising temperature of the resin medium above the boiling temperature of the liquid medium and the reaction water.

16. The process of claim 1, wherein the liquid medium of the suspension comprises an organic solvent having a functional group reactive in the synthesis of the resin medium.

17. The process of claim 1, wherein the non-aqueous second resin medium comprises about 2 to about 30% by weight organic microparticles/nanoparticles, based on the total weight of the second resin medium.

18. The process of claim 1, wherein the non-aqueous second resin medium is a thermosetting resin.

19. The process of claim 1, wherein the non-aqueous second resin medium further comprises an unsaturated monomer.

20. The process of claim 1, wherein the first resin dispersion or emulsion further comprises a surfactant, an organic solvent as a co-solvent with water, or both.

* * * * *